United States Patent

Horikoshi et al.

Patent Number: 5,142,172
Date of Patent: Aug. 25, 1992

[54] RECTILINEAR-MOTION DRIVING DEVICE FOR VOICE COIL MOTOR

[75] Inventors: Michio Horikoshi, Moriyamachi; Kazuo Watanabe, Ushiku; Tadayuki Kubo, Tsuchiura, all of Japan

[73] Assignee: Canon Kabushiki Kaisha, Tokyo, Japan

[21] Appl. No.: 682,960

[22] Filed: Apr. 10, 1991

[30] Foreign Application Priority Data

Apr. 16, 1990 [JP] Japan ................. 2-100776

[51] Int. Cl.[5] .............. H02K 33/06; H02K 41/02; F16C 32/06
[52] U.S. Cl. ............................. 310/13; 310/90
[58] Field of Search ............ 310/12, 13, 15, 90; 384/12

[56] References Cited

U.S. PATENT DOCUMENTS

| | | | |
|---|---|---|---|
| 4,439,699 | 3/1984 | Brende et al. | 310/13 |
| 4,585,397 | 4/1986 | Crawford et al. | 310/13 |
| 4,740,946 | 4/1988 | Yumura et al. | 310/13 |
| 4,920,288 | 4/1990 | den Heijer et al. | 310/15 |

FOREIGN PATENT DOCUMENTS 59-72317  5/1984  Japan .

OTHER PUBLICATIONS

"Japanese Precise Engineering Society Journal", pp. 465-468 (date of publication unknown).

Primary Examiner—Steven L. Stephan
Assistant Examiner—D. L. Rebsch
Attorney, Agent, or Firm—Fitzpatrick, Cella, Harper & Scinto

[57] ABSTRACT

A linear-motion driving device includes a movable shaft, a gas bearing for supporting the movable shaft, a housing for supporting the gas bearing, and a motor having a voice coil for displacing the movable shaft. The bearing housing is disposed inside the voice coil.

9 Claims, 3 Drawing Sheets

RECTILINEAR-MOTION DRIVING DEVICE FOR VOICE COIL MOTOR

FIELD OF THE INVENTION AND RELATED ART

This invention relates to a rectilinear-motion driving device having a combination of a static pressure gas bearing and a voice coil motor.

A typical example of such a rectilinear-motion driving device usable in a precise measurement machine or the like, is shown in FIG. 5. In this device, a shaft 102 is supported by a static pressure bearing 101. Voice coil motor 103 is disposed at an end of the shaft, while a linear encoder 104 is mounted at another end. To the end 102a of the shaft 102, a measuring head or the like can be mounted. The voice coil motor 103 is responsive to a signal from the linear encoder 104 to drive the shaft 102 to a desired position.

In this example, however, since the voice coil motor 103 is disposed at an end of the shaft 102, there are disadvantages such as follows:

(1) Since a large weight such as the coil of the voice coil motor (i.e., driving system) is mounted to an end portion of the shaft, moment load is applied to the shaft, causing degradation of feeding precision.
(2) The structure of the feeding device as a whole is bulky.

SUMMARY OF THE INVENTION

It is accordingly a primary object of the present invention to provide a rectilinear-motion driving device which is compact and which assures high-precision feeding.

In accordance with an aspect of the present invention, to achieve this object there is provided a rectilinear-motion driving device having a static pressure gas bearing and a voice coil motor, for driving and positioning a shaft to and at a desired position, wherein the static pressure gas bearing and the shaft supported thereby are disposed inside a voice coil of the voice coil motor. Preferably, a bearing housing of the static pressure gas bearing serves also as a yoke of the voice coil motor.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiments of the present invention will be explained in detail in conjunction with the drawings.

Figure 1:
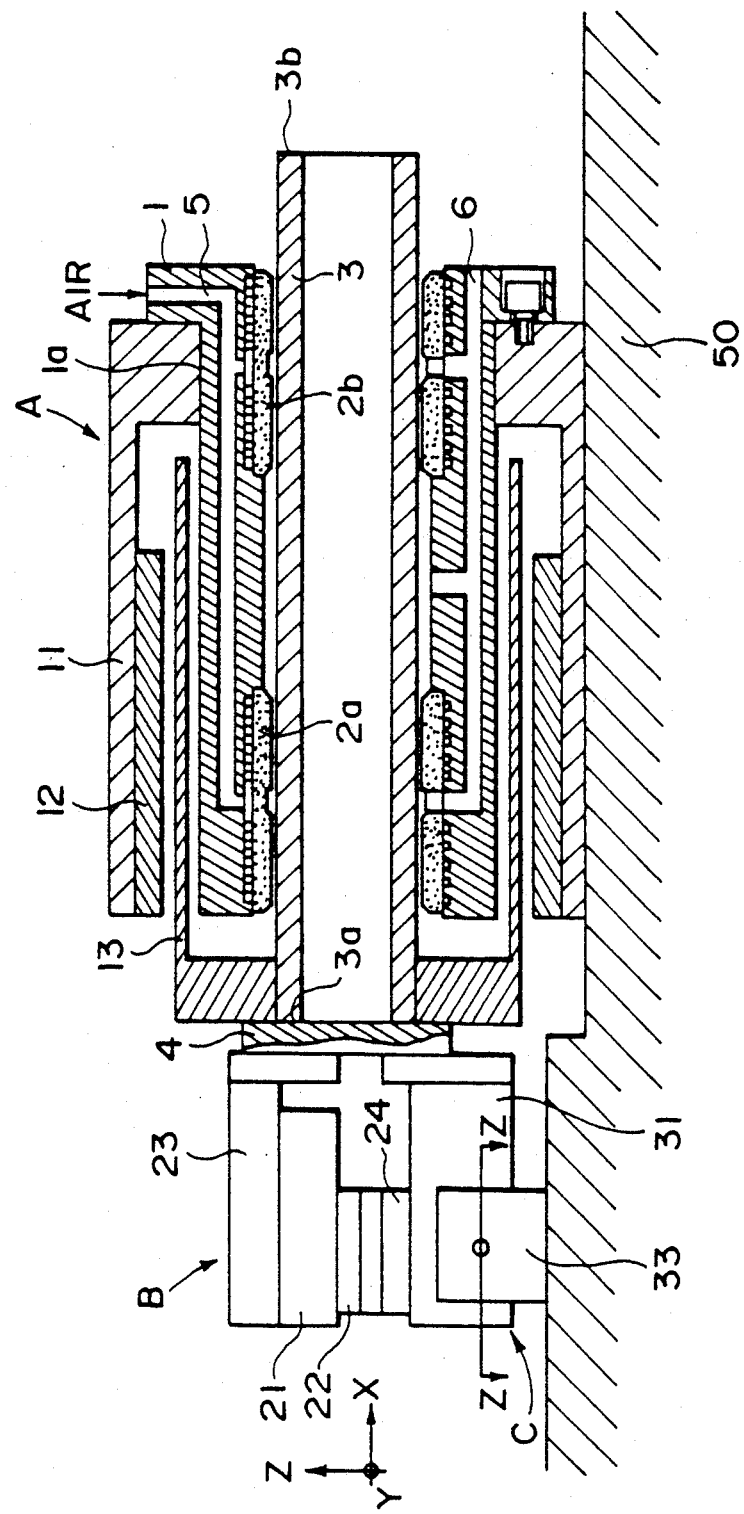
FIG. 1 is a sectional view of a rectilinear-motion driving device according to an embodiment of the present invention.
Figure 2:
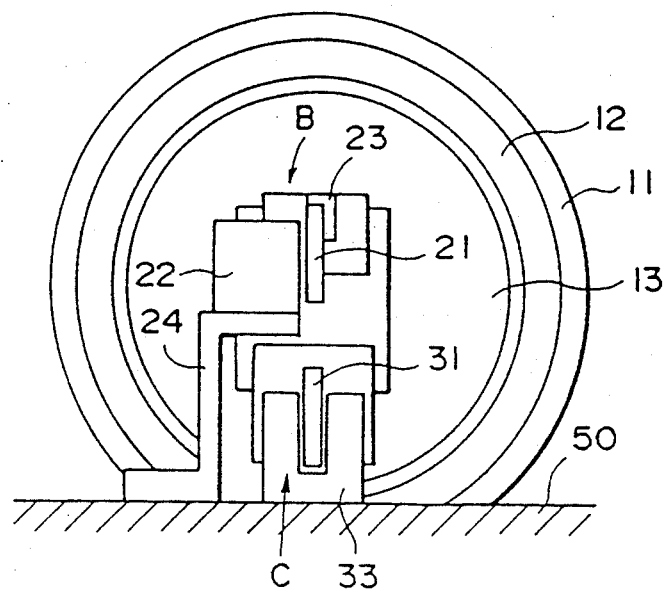
FIG. 2 is view of the device of the FIG. 1 embodiment.

Referring first to FIGS. 1 and 2, showing an embodiment of the present invention, denoted at 1 is a cylindrical bearing housing which is made of a magnetizable material. Inside the bearing housing and at opposite end portions thereof, there are provided ring-like porous-material bearings 2a and 2b. Denoted at 3 is a shaft member (hollow shaft) supported statically by air discharged from the gas bearings 2a and 2b, for displacement in its longitudinal direction (X direction). Stationary plate 4 is mounted to an end portion 3a of the shaft 3. An unshown measuring instrument, for example, can be mounted to another end portion (mounting seat) 3b of the shaft 3.

Denoted at 11 is a motor housing which receives the outer peripheral surface 1a of the bearing housing 1 to cover the same. The motor housing 11 is fixed to the bearing housing 1 by means of volts or the like. The motor housing 11 is fixed to a base 50 by means of an unshown bracket or the like. As illustrated, a magnet 12 of a ring-like shape (see FIG. 2) is mounted to the inside peripheral surface of the motor housing 11. Denoted at 13 is a voice coil of a similar ring-like shape which is inserted into the motor housing 11 along the X direction. Also, it is fixed to the shaft 3 through the stationary plate 4. The voice coil 12 extends from the stationary plate 4 along the shaft 3, so as to cover the shaft 3.

The bearing housing 1, the voice coil 13 and the magnet 12 are disposed concentrically, with predetermined interstices, to provide a voice coil motor A. Here, since the bearing housing 1 is made of a magnetizable material, it serves as a center yoke. In the drawing, the shaft 3 is at a rightmost end position of its stroke.

Denoted at B is a linear encoder comprising a scale 21 and a detecting head 22. The scale 21 is fixed to the shaft 1 through a bracket 23, which is mounted to the stationary plate 4 at a position remote from the voice coil 13. Also, as best seen in FIG. 2, the detecting head 22 is fixed to the base 50 by means of a bracket 24.

Figure 3:
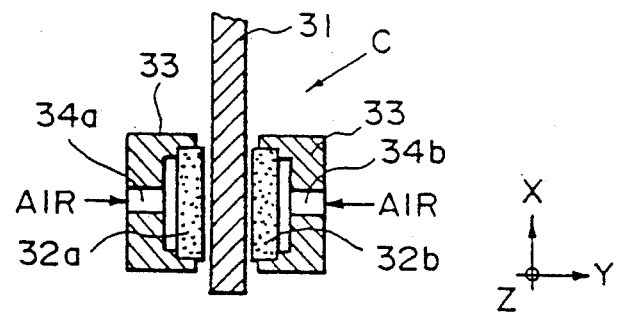
FIG. 3 is a sectional view of a rotation blocking unit of the FIG. 1 embodiment.
Figure 5:
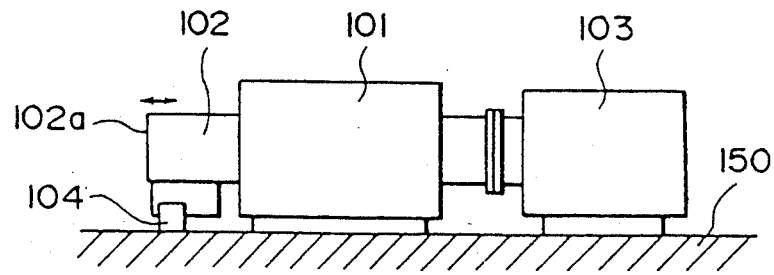
FIG. 5 schematic view of a rectilinear-motion driving device of known type.

Denoted at C is a rotation blocking unit for preventing motion of the shaft 3 in a rotational direction. As best seen in FIG. 3, which corresponds to a Z—Z section in FIG. 1, the rotation blocking unit C comprises a guide plate 31 mounted to the stationary plate 4 at a side thereof remote from the voice coil 13, and a guide block 33 for holding porous material members 32a and 32b disposed at the opposite sides of the guide plate 31 with desired clearances thereto. Pressurized gas (air) is supplied from an unshown pressurized gas supplying source to each of bores 34a and 34b, formed in the guide block 33, and pressurized gases are discharged from the surfaces of the porous material members 32a and 32b into the clearances between the guide plate 31 and the porous material members, whereby displacement in the lateral direction (Y direction) of the guide plate 31 is prevented.

In the feeding device of the structure described above, when a pressurized gas is supplied from an unshown pressurized gas supplying source to an inlet port 5 of the bearing housing 1, the pressurized gas passes through each of the ring-like porous material bearings 2a and 2b and is discharged into a small clearance between the shaft 3 and the bearings 2a and 2b, to thereby statically support the shaft 3. Thereafter, the gas is discharged outwardly of the housing 1, from an outlet port 5 and from the clearance between the shaft 3 and the end of the bearing 2b. In this state, the voice coil motor A can operate to move the shaft 3 in the X direction to a desired position, with the drive being controlled on the basis of a position signal from the linear encoder 8. Here, since the shaft 3 and the gas bearings 2a and 2b are disposed inside the voice coil 13, there is no overhanging of the voice coil motor A (driving system) to the bearings 2a and 2b and, thus, moment load is minimized. Therefore, high-precision feeding is possible.

Figure 4:
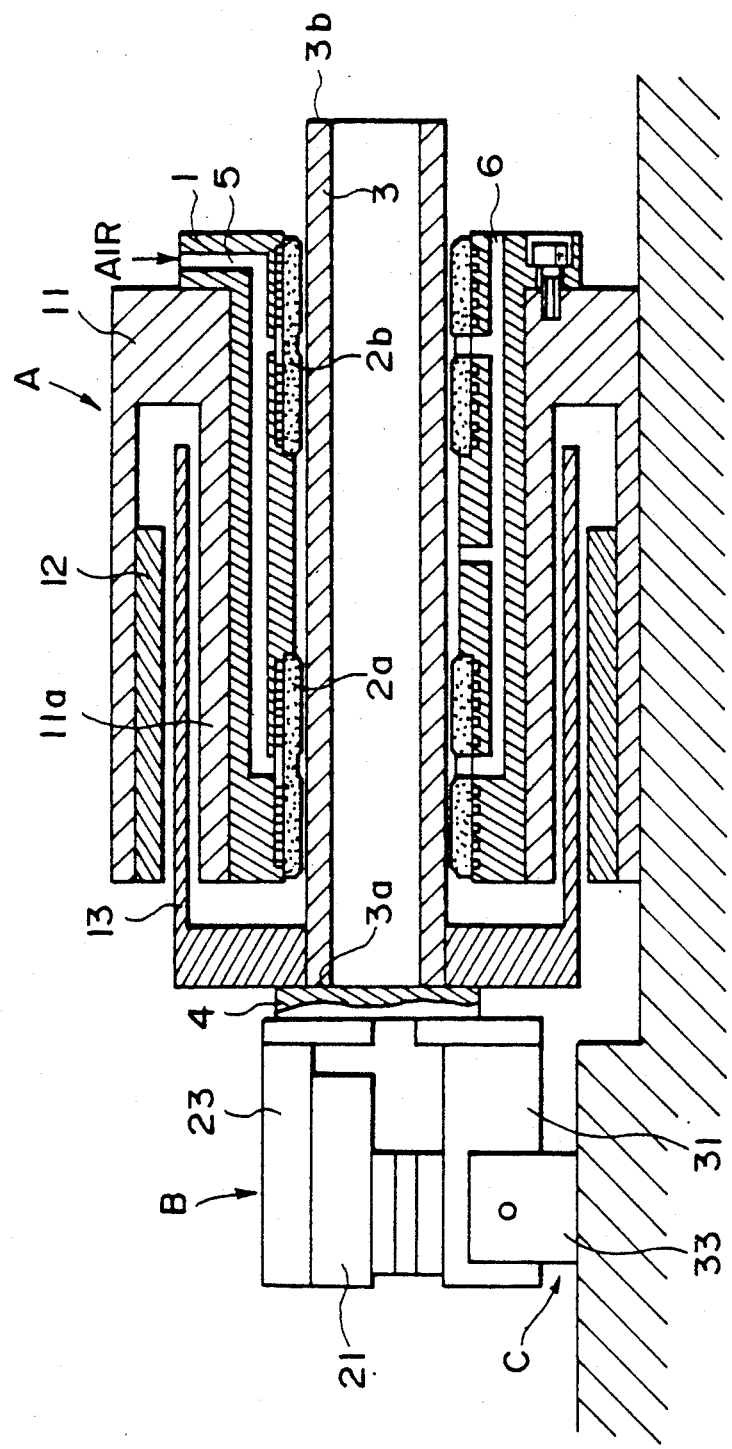
FIG. 4 is a sectional view of another embodiment of the present invention.

FIG. 4 shows another embodiment of the present invention. In this embodiment, a motor housing 11 has a center yoke portion 11a disposed therewithin. The center yoke 11a portion receives a bearing housing 1. In this embodiment, the motor housing 11, the center yoke 11a, a magnet 12 and a voice coil 13 cooperate to provide a voice coil motor A. Therefore, in this embodiment, the material of the bearing housing 1 is not limited to a magnetizable material, but a non-magnetizable material such as ceramics, for example, may be used. The remaining portion of this embodiment is essentially the same as the FIG. 1 embodiment.

In the foregoing description, the gas bearings 2a and 2b each provide porous material restriction. However, any other types of restriction such as, for example, self-forming restriction, surface restriction, orifice restriction or the like, may be formed.

In accordance with these embodiments of the present invention, as described hereinbefore, a static pressure gas bearing and a shaft member to be supported by the static pressure gas bearing are disposed inside a voice coil. As a result, when a coil is mounted to a movable member (shaft 3), the gravity center of the movable member can be positioned inside the span of the bearing (porous material gas bearings 2a and 2b) or can be made closer to the inside of the span. Therefore, with these embodiments of the present invention, there is no overhanging of the driving system to the bearing and, thus, high-precision feeding is possible. Further, with these embodiments of the present invention, the structure of the device as a whole can be made compact.

While the invention has been described with reference to the structures disclosed herein, it is not confined to the details set forth and this application is intended to cover such modifications or changes as may come within the purposes of the improvements or the scope of the following claims

What is claimed is:

1. A linear-motion driving device, comprising:
a movable member;
a gas bearing having a pad for supporting said movable member;
a motor having a voice coil for displacing said movable member along a predetermined axial direction, wherein said voice coil is formed as a unit with said movable member and wherein said pad and said movable member are disposed inside said voice coil; and
a mechanism for limiting rotational motion of said movable member about said axial direction, wherein said limiting mechanism includes a guide plate formed as a unit with said movable member and disposed outside said voice coil, and wherein said limiting mechanism limits the rotational motion of said movable member by using said guide plate and static gas pressure.

2. A device according to claim 1, wherein said pad and said voice coil are disposed concentrically.

3. A linear-motion driving device, comprising:
a movable shaft;
a bearing housing having a longitudinal bore through which said movable shaft extends;
first and second gas bearing means provided at opposite ends of said bearing housing, respectively, for supporting said movable shaft relative to said bearing housing with use of static gas pressure;
a motor for moving said movable shaft relative to said bearing housing along an axial direction, said motor having a motor housing for covering said bearing housing, a magnet attached to said motor housing and a voice coil fixed to an end portion of said movable shaft by a fixed plate, wherein said voice coil is disposed inside said motor housing and extends in a direction covering said movable shaft; and
a mechanism for limiting rotational motion of said movable shaft, said limiting means having a guide plate attached to said end portion of said movable shaft to which said voice coil is fixed.

4. A device according to claim 3, wherein said limiting mechanism has a guide block for discharging pressurized air to opposite sides of said guide plate.

5. A device according to claim 3, wherein said bearing housing is formed with a discharge port through which a portion of air passing through one of said first and second gas bearing means and serving to support said movable shaft by static pressure is discharged outwardly through said bearing housing.

6. A device according to claim 5, wherein each of said first and second bearing means has a porous material gas bearing member of ring-like shape.

7. A device according to claim 3, wherein said magnet is provided inside said motor housing.

8. A device according to claim 7, wherein said motor housing extends so as to accommodate therein at least a portion of said bearing housing.

9. A device according to claim 3, further comprising a linear encoder for controlling movement of said movable shaft and having a scale attached to said end portion of said movable shaft to which said voice coil is fixed.

* * * * *

UNITED STATES PATENT AND TRADEMARK OFFICE
CERTIFICATE OF CORRECTION

PATENT NO. : 5,142,172

DATED : August 25, 1992

INVENTOR(S) : Michio Horikoshi, et al.

It is certified that error appears in the above-identified patent and that said Letters Patent is hereby corrected as shown below:

COLUMN 2:

Line 17, "volts" should read --bolts--.

Signed and Sealed this

Twelfth Day of October, 1993

Attest:

BRUCE LEHMAN

Attesting Officer     Commissioner of Patents and Trademarks